United States Patent
Isaksson

(10) Patent No.: US 9,071,705 B2
(45) Date of Patent: Jun. 30, 2015

(54) SYNCHRONIZING CHARGING FOR TELECOMMUNICATION SERVICE WITH NOTIFICATION OF APPLICABLE TARIFF

(71) Applicant: Telefonaktiebolaget L M Ericsson (publ), Stockholm (SE)

(72) Inventor: Lennart Isaksson, Karlskrona (SE)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 0 days.

(21) Appl. No.: 13/921,374

(22) Filed: Jun. 19, 2013

(65) Prior Publication Data

US 2014/0378093 A1    Dec. 25, 2014

(51) Int. Cl.
*H04M 15/00* (2006.01)
*H04M 11/00* (2006.01)

(52) U.S. Cl.
CPC .................. *H04M 15/8033* (2013.01)

(58) Field of Classification Search
CPC ..... H04M 15/00; H04M 15/43; H04M 15/80; H04M 15/8083
USPC ............. 379/114.01, 114.03, 114.06, 114.28, 379/115.01; 455/405–408
See application file for complete search history.

(56) References Cited

U.S. PATENT DOCUMENTS

| | | | |
|---|---|---|---|
| 6,577,719 B2 * | 6/2003 | Simonen et al. ............... | 379/126 |
| 2002/0022472 A1 | 2/2002 | Walter et al. | |
| 2002/0097852 A1 * | 7/2002 | Huyghe et al. ........... | 379/114.01 |
| 2004/0121758 A1 | 6/2004 | Hoche et al. | |
| 2006/0019630 A1 | 1/2006 | Sposato et al. | |
| 2007/0149849 A1 | 6/2007 | Karlsson | |
| 2008/0182552 A1 * | 7/2008 | Dinh et al. ..................... | 455/408 |
| 2009/0076952 A1 | 3/2009 | Cadenas et al. | |
| 2010/0104076 A1 | 4/2010 | Abrahamsson et al. | |
| 2010/0188975 A1 | 7/2010 | Raleigh | |
| 2011/0086611 A1 | 4/2011 | Klein et al. | |
| 2011/0164736 A1 * | 7/2011 | Farthofer et al. ........ | 379/114.01 |

FOREIGN PATENT DOCUMENTS

| | | |
|---|---|---|
| EP | 1 298 908 | 4/2003 |
| EP | 1 732 302 | 6/2005 |
| EP | 1 881 688 A1 | 1/2008 |

OTHER PUBLICATIONS

PCT Written Opinion of the International Searching Authority for the International application No. PCT/SE2014/050739, Oct. 28, 2014.

(Continued)

*Primary Examiner* — Quoc D Tran
(74) *Attorney, Agent, or Firm* — Baker Botts, LLP

(57) ABSTRACT

A charging system (26) for a telecommunications service comprises an interface (48) and a tariff controller (50). The interface (48) is configured to receive tariff information (6-4) regarding a telecommunications service for a geographical area (64). The tariff controller (50) is configured to utilize the tariff information in conjunction with charging for use of the telecommunications service by a customer in the geographical area (64) only after confirmation has been received (6-11) that notification regarding the tariff information has been received by a node (60) of a radio access network (32) which serves the geographical area (64). As such, the tariff controller (50) provides notification-synchronized charging implementation.

15 Claims, 7 Drawing Sheets

(56) References Cited

OTHER PUBLICATIONS

U.S. Appl. No. 13/464,397, entitled "Product-Centric Charging System and Method", May 4, 2012.
U.S. Appl. No. 13/538,340, entitled "Telecommunications Charging With Externally-Controlled Account Selection", Jun. 29, 2012.
U.S. Appl. No. 13/538,000, entitled "Terminal-Initiated Override of Charging System Rules", Jun. 29, 2012.
U.S. Appl. No. 13/896,417, entitled "Charging Systems and Methods for Telecommunications", May 17, 2013.
U.S. Appl. No. 12/258,990, entitled "Real-Time Flexible Account Selection for Communications", Oct. 27, 2008.
GSM 02.60 V8.1.0, Technical Specification, "Digital Cellular Telecommunications System (Phase 2+); General Packet Radio Service (GPRS); Service Description, Stage 1", (GSM 02.60 version 8.1.0 Release 1999) (Jul. 1999).
ETSI EN 300 923 V7.0.1 , Digital Cellular Telecommunications System (Phase 2+); Description of Charge Advice Information (CAI) (GSM 02.24 version 7.0.1 Release 1998) (Jan. 2000).
ETSI TS 100 508 V7.2.0, Technical Specification, Digital Cellular Telecommunications System (Phase 2+); International Mobile Station Equipment Identities (IMEI) (GSM 02.16 version 7.2.0 Release 1998) (Jun. 2000).
RFC 3588, Calhoun et al., "Diameter Base Protocol," Sep. 2003.
RFC 4006, Hakala et al., "Diameter Credit-Control Application", Aug. 2005.
Office Action mailed Mar. 30, 2012 in U.S. Appl. No. 12/258,990.
Final Office Action mailed Apr. 26, 2013 in U.S. Appl. No. 12/258,990.
Office Action mailed Dec. 11, 2012 in U.S. Appl. No. 13/464,397.
International Search Report and Written Opinion mailed Oct. 27, 2009 in PCT Application No. PCT/SE2009/050849.
3GPP TS 32.299 V11.6.0, $3^{rd}$ Generation Partnership Project; Technical Specification Group Services and System Aspects; Telecommunication Management; Charging Management; Diameter Charging Application (Release 11) (Dec. 2012).
3GPP TS 32.251 V12.0.0 (Dec. 2012); 3rd Generation Partnership Project; Technical Specification Group Services and System Aspects; Telecommunication Management; Charging Management; Packet Switched Domain Charging (Release 12).

\* cited by examiner

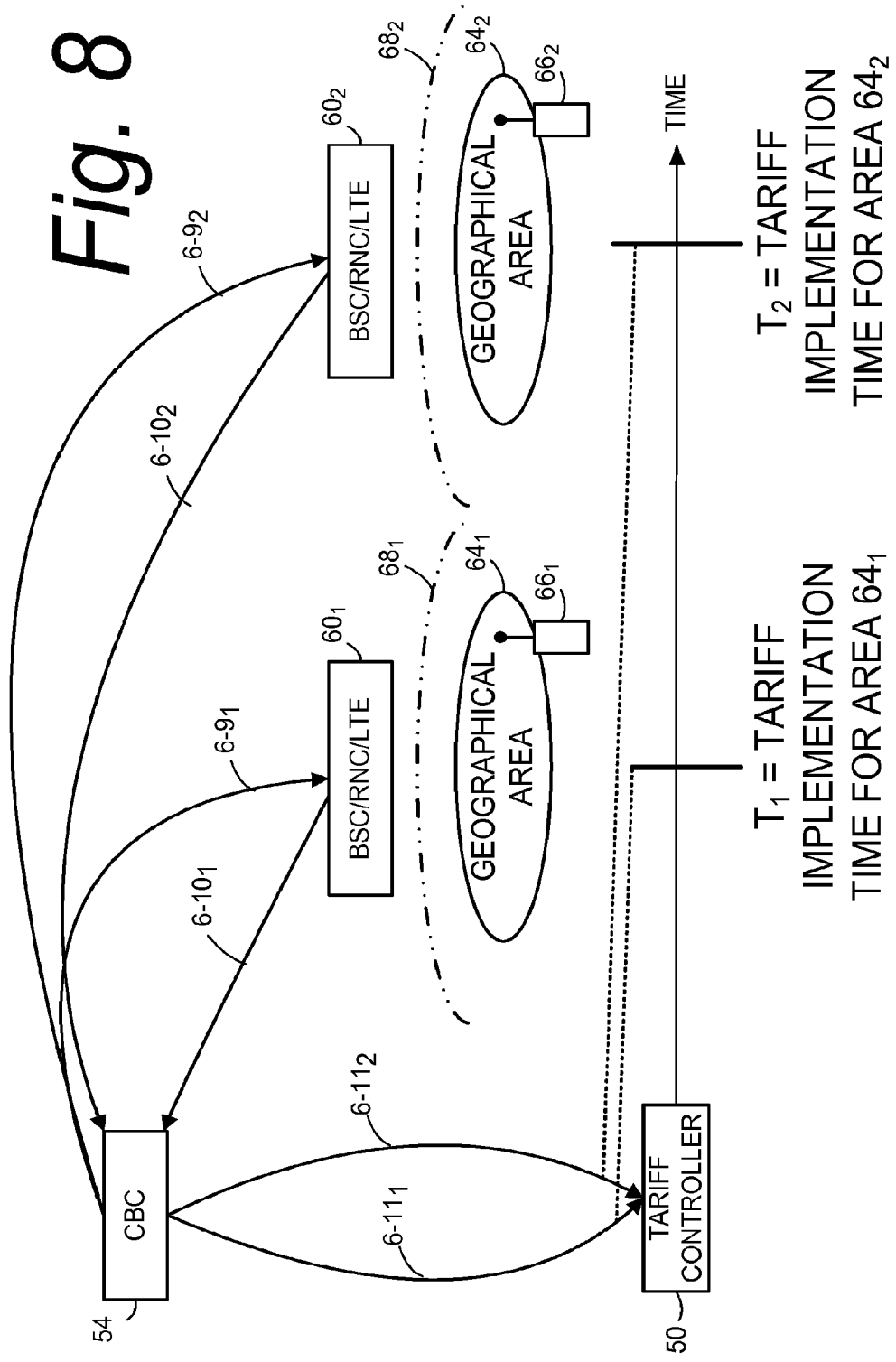

SYNCHRONIZING CHARGING FOR TELECOMMUNICATION SERVICE WITH NOTIFICATION OF APPLICABLE TARIFF

TECHNICAL FIELD

The technology relates to charging or financial accounting for use of telecommunications services.

BACKGROUND

For many products and/or services a customer or subscriber desires that a financial charge for the product/service be satisfied or paid from one or more of accounts, e.g., asset accounts owned by the customer or authorized for the customer's use. The debiting of the appropriate accounts, or reserving of assets in the appropriate accounts, is generally handled by a charging system.

Examples of online charging systems (OCS) and various techniques for use therewith are described in one or more of the following, all of which are incorporated herein by reference entirely:

(1) U.S. patent application Ser. No. 12/258,990, entitled "REAL-TIME FLEXIBLE ACCOUNT SELECTION FOR COMMUNICATIONS";

(2) U.S. patent application Ser. No. 13/464,397, entitled "PRODUCT-CENTRIC CHARGING SYSTEM AND METHOD";

(3) U.S. patent application Ser. No. 13/538,000, entitled "TERMINAL-INITIATED OVERRIDE OF CHARGING SYSTEM RULES";

(4) U.S. patent application Ser. No. 13/538,340, entitled "TELECOMMUNICATIONS CHARGING WITH EXTERNALLY-CONTROLLED ACCOUNT SELECTION";

(5) U.S. patent application Ser. No. 13/896,417, entitled "CHARGING SYSTEMS AND METHODS FOR TELECOMMUNICATIONS";

A charging system generally determines or computes an amount to be debited or deducted from a customer account for use of one or more services. The customer account may be either a prepaid account or a postpaid account. The amount of the debit or deduction depends, at least in part, on a cost or tariff associated with the service at the particular time of use of the service. As used herein, "tariff" means the cost, either per access or per unit of resource (e.g., time or bandwidth), or rate or fee assessed for use of a telecommunications service.

The tariff for a service may depend on several factors, such as location of the customer. Moreover, the tariff for a telecommunications service likely changes from time to time, and may even change quite rapidly (e.g., at hourly increments). A charging system is typically notified or programmed in advance that a tariff change is to occur. For example, the charging system may be notified that a planned implementation time $T_x$ the tariff for customers of a certain service is to change from tariff R to tariff R'. When the internal clock of the charging system reaches time $T_x$, the tariff for the affected customers changes from tariff R to tariff R'. Thereafter, the affected customers are charged for use of the service in accordance with the tariff R'.

For some services the tariff, or change in tariff, is pre-announced to customers or users via a notification message. Moreover, in some instances and for some services, the customers may be able to contact an operator, service provider, or agent for the operator or service provider, and inquire of the applicable tariff prior to actual usage by the customer of the service. This enables the customer to be better informed regarding the anticipated cost of the service before actual usage. For example, a customer or subscriber may be able to send an inquiry using the customer's mobile device (e.g., mobile terminal or user equipment or cell phone) to ascertain a quote for the applicable tariff for access to the service. Upon receipt of the tariff information to the customer's mobile device, the customer may intelligently determine whether the use of the quoted tariff is consistent with the customer's budget and preferences before using the service.

An example implementation of the foregoing has been termed "Yield Optimization". Yield Optimization means that a subscriber may obtain dynamic pricing on used service. The used service may be, e.g., making a phone call, sending a short message service text (SMS), or downloading a movie, for examples. A Yield Optimization discount may be related to factors such as location and time. Before using a service the customer may check the discount and see if the amount/level of the discount, and thus the current resulting tariff, is appealing or not.

For customers or subscribers having mobile terminals or the like, the notification of a tariff, e.g., of a tariff change such as the change from tariff R to tariff R', may take considerable time and thus notifications or inquiry responses regarding the tariff change may reach the customer considerably after the planned implementation time T. The tariff notifications may involve delivery of notifications to thousands or even ten thousands of cells. The tariff notifications are typically delivered to nodes (e.g., base station controllers or radio network controllers) of a radio access network that control radio base stations that serve the cells, or in some network such as Long Term Evolution (LTE) to the very base stations themselves. The nodes responsible for the served cells may then "broadcast" or otherwise make available the tariff notifications to the wireless terminals (e.g., cell phones, user equipments, mobile devices) that are served by the nodes.

The telecommunications and other signaling associated with such notification may require many minutes, even tens of minutes, to reach the base stations handling more lately notified cells. In general, a mean value for a broadcast distribution latency value would be between ~0.5 seconds and ~1.5 seconds, depending on the base station type. The speed of the broadcast delivery also depends on the number of threads for the provisioning. Several broadcast jobs could be executed simultaneously. Nevertheless, the last broadcasted message could be many minutes delayed.

In a lately notified cell a customer making access to the affected service may be caught in a time gap after the planned implementation time $T_x$ but before notification of the tariff change, which may result in the customer accessing the service with inaccurate tariff information. This situation may not be acceptable to the customer or desirable from the standpoint of customer relations, particularly if the change from tariff R to tariff R' happened to be an increase.

Thus, it should be understood that a broadcasted message carrying a tariff notification may show an old discount or tariff (e.g., previous hour value) that is not valid any longer. But in the rating logic of the charging system the new discount or new tariff already has already been loaded and will be used in the rating of the selected service at and after the planned implementation time Tx regardless of the gap between the planned implementation time and the notification. So, a mismatch in time could occur between the new discount or new tariff for the rating logic and the broadcasted discount or tariff stored in the node or server (e.g., the base station) that is consulted by the customer. Whether the gap turns out to be detrimental or not may depend on how soon the cell serving the customer is provided with the updated notification regarding the new tariff R'. The less fortunate customers are those in cells which, due to location or other factor, may be late or even last cells to be updated, and thus the tariff change may be broadcasted too late and thus provided with incorrect tariff information.

FIG. 1 shows an example situation or scenario in which a tariff notification has been sent to approximately ten thousand cells. The x-axis indicates the time, between 11:00 and 12:00. The y-axis indicates the number of cells. Each cell is represented as a line (latency time) with a starting and an end time. All cells are sorted according to its start time. The first few cells are provisioned with the tariff notification close to 11 o'clock. However, the last cells are provisioned with the tariff notification at 11:21. FIG. 1 thus demonstrates that in the illustrated scenario a possible mismatch or gap in time of about twenty one minutes may exist for a broadcast message which provisions or provides tariff information.

SUMMARY

In one of its aspects the technology disclosed herein concerns a charging system for a telecommunications service. The charging system comprises an interface and a tariff controller. The interface is configured to receive tariff information regarding a telecommunications service for a geographical area. The tariff controller is configured to utilize the tariff information in conjunction with charging for use of the telecommunications service by a customer in the geographical area only after confirmation has been received that notification regarding the tariff information has been received by a node of a radio access network which serves the geographical area.

In an example embodiment and mode, the interface is configured to receive a message that indicates that the confirmation has been received.

In an example embodiment and mode, the geographical area comprises wireless terminals served by a cell of the radio access network, and the confirmation comprises confirmation that the notification regarding the tariff information has been received by the node which serves the cell.

In an example embodiment and mode, the tariff controller is provided with the tariff information for plural geographical areas, and on an individual geographical area basis the tariff controller is configured to utilize the tariff information in conjunction with the charging for use of the telecommunications service by the customer in the individual geographical area only after the confirmation has been received that the notification regarding the tariff information has been received by the node of the radio access network which serves the individual geographical area.

In another of its aspects the technology disclosed herein comprises a method of operating a telecommunications service. The method comprises (1) providing tariff information regarding a telecommunications service for a geographical area to a tariff controller; (2) providing notification regarding the tariff information to a node of a radio access network which serves the geographical area; and (3) the tariff controller utilizing the tariff information in conjunction with charging for use of the telecommunications service by a customer in the geographical area only after confirmation has been received that the notification regarding the tariff information has been received by the node of the radio access network which serves the geographical area.

In an example embodiment and mode, the geographical area comprises wireless terminals served by a cell of the radio access network, and the confirmation comprises confirmation that the notification regarding the tariff information has been received by the node which serves the cell.

In an example embodiment and mode, the tariff information concerns plural geographical areas served by corresponding plural nodes, and the method further comprises: providing notification regarding the tariff information to the plural corresponding nodes of a radio access network which serve the plural geographical areas; the tariff controller, on an individual geographical area basis and for each of the plural geographical areas, utilizing the tariff information in conjunction with the charging for use of the telecommunications service by customer(s) in the individual geographical area only after the confirmation has been received that the notification regarding the tariff information has been received by the corresponding node of the radio access network which serves the corresponding individual geographical area.

In an example embodiment and mode, the method further comprises: (i) providing the tariff information to a communications server; (ii) using the communications server for providing the notification regarding the tariff information to the node of the radio access network which serves the geographical area; and (iii) the communications server receiving the confirmation that the notification regarding the tariff information has been received by the node of the radio access network which serves the geographical area; (iv) upon receiving the confirmation, the communications server: (a) providing notification of the confirmation to the tariff controller; and (b) updating a communications server database with the tariff information upon receiving the confirmation and thereafter (c) using the tariff information for responding to a tariff inquiry from the geographical area.

In another of its aspects the technology disclosed herein concerns a communications server comprising a processor configured to: (i) receive tariff information regarding a telecommunications service for a geographical area; (ii) provide notification regarding the tariff information to the node of a radio access network which serves the geographical area; (iii) receive confirmation that the notification regarding the tariff information has been received by the node of the radio access network which serves the geographical area; and thereafter (iv) provide notification of the confirmation to a tariff controller which utilizes the tariff information in conjunction with charging for use of the telecommunications service by a customer of the geographical area only after the notification of the confirmation has been received.

In an example embodiment and mode, the communications server comprises a communications server database, and the processor is further configured to update the communications server database with the tariff information upon receiving the confirmation so that thereafter the communications server uses the tariff information for responding to a tariff inquiry from the geographical area.

In another of its aspects the technology disclosed herein concerns a method in a charging system for a telecommunications service. The method comprises receiving tariff information regarding a telecommunications service for a geographical area; and utilizing the tariff information in conjunction with charging for use of the telecommunications service by a customer in the geographical area only after confirmation has been received that notification regarding the tariff information has been received by a node of a radio access network which serves the geographical area.

In an example embodiment and mode, the method further comprises receiving a message that indicates that the confirmation has been received.

In an example embodiment and mode, the geographical area comprises wireless terminals served by a cell of the radio access network, and the confirmation comprises confirmation that the notification regarding the tariff information has been received by the node which serves the cell.

In an example embodiment and mode, the method further comprises receiving the tariff information for plural geographical areas, and wherein on an individual geographical area basis utilizing the tariff information in conjunction with the charging for use of the telecommunications service by the customer in the individual geographical area only after the confirmation has been received that the notification regarding the tariff information has been received by the node of the radio access network which serves the individual geographical area.

In another of its aspects the technology disclosed herein concerns a telecommunications service comprising a tariff controller and a node of a radio access network. The tariff controller is configured to receive tariff information regarding a telecommunications service for a geographical area. The node of the radio access network serves the geographical area receives the notification regarding the tariff information. The tariff controller is further configured to utilize the tariff information in conjunction with charging for use of the telecommunications service by a customer in the geographical area only after confirmation has been received that the notification regarding the tariff information has been received by the node of the radio access network which serves the geographical area.

In an example embodiment and mode, the geographical area comprises wireless terminals served by a cell of the radio access network, and the confirmation comprises confirmation that the notification regarding the tariff information has been received by the node which serves the cell.

In an example embodiment and mode, the tariff information concerns plural geographical areas served by corresponding plural nodes and the tariff controller is configured to receive notification regarding the tariff information to the plural corresponding nodes of a radio access network which serve the plural geographical areas. The tariff controller, on an individual geographical area basis and for each of the plural geographical areas, is configured to utilize the tariff information in conjunction with the charging for use of the telecommunications service by customer(s) in the individual geographical area only after the confirmation has been received that the notification regarding the tariff information has been received by the corresponding node of the radio access network which serves the corresponding individual geographical area.

In an example embodiment and mode, communications server is configured (i) to receive the tariff information; (ii) to provide the notification regarding the tariff information to the node of the radio access network which serves the geographical area; (iii) to receive the confirmation that the notification regarding the tariff information has been received by the node of the radio access network which serves the geographical area; and (iv) upon receiving the confirmation, configured to: (a) provide notification of the confirmation to the tariff controller; (b) update a communications server database with the tariff information upon receiving the confirmation and thereafter (c) using the tariff information for responding to a tariff inquiry from the geographical area.

In another of its aspects the technology disclosed herein concerns a method of operating a communications server. The method comprises: receiving tariff information regarding a telecommunications service for a geographical area; providing notification regarding the tariff information to the node of a radio access network which serves the geographical area; receiving confirmation that the notification regarding the tariff information has been received by the node of the radio access network which serves the geographical area; and thereafter providing notification of the confirmation to a tariff controller which utilizes the tariff information in conjunction with charging for use of the telecommunications service by a customer of the geographical area only after the notification of the confirmation has been received.

In an example embodiment and mode, the method further comprises updating a communications server database with the tariff information upon receiving the confirmation so that thereafter the communications server uses the tariff information for responding to a tariff inquiry from the geographical area.

BRIEF DESCRIPTION OF THE DRAWINGS

The foregoing and other objects, features, and advantages of the technology disclosed herein will be apparent from the following more particular description of preferred embodiments as illustrated in the accompanying drawings in which reference characters refer to the same parts throughout the various views. The drawings are not necessarily to scale, emphasis instead being placed upon illustrating the principles of the technology disclosed herein.

FIG. 8 is a diagrammatic view depicting operation of a charging system having notification-synchronized charging implementation and in particular plural synchronized implementation times in a context of plural geographical areas.

DETAILED DESCRIPTION

Figure 1:
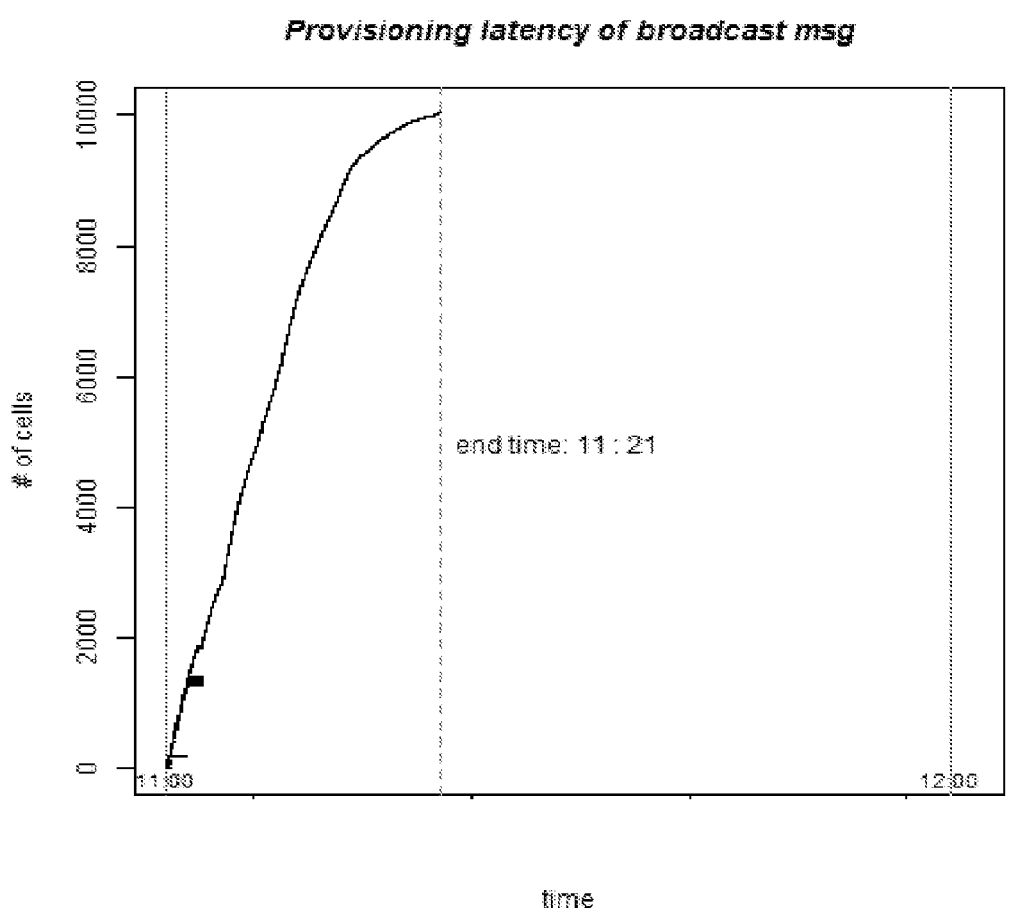
FIG. 1 is a graph illustrating problems of operating a charging system according to prior art practice.

In the following description, for purposes of explanation and not limitation, specific details are set forth such as particular architectures, interfaces, techniques, etc. in order to provide a thorough understanding of the technology disclosed herein. However, it will be apparent to those skilled in the art that the technology disclosed herein may be practiced in other embodiments that depart from these specific details. That is, those skilled in the art will be able to devise various arrangements which, although not explicitly described or shown herein, embody the principles of the technology disclosed herein and are included within its spirit and scope. In some instances, detailed descriptions of well-known devices, circuits, and methods are omitted so as not to obscure the description of the technology disclosed herein with unnecessary detail. All statements herein reciting principles, aspects, and embodiments of the technology disclosed herein, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein can represent conceptual views of illustrative circuitry or other functional units embodying the principles of the technology. Similarly, it will be appreciated that any flow charts him and, state transition diagrams, pseudocode, and the like represent various processes which may be substantially represented in computer readable medium and so executed by a computer or processor, whether or not such computer or processor is explicitly shown.

The functions of the various elements including functional blocks, including but not limited to those labeled or described as "computer", "processor" or "controller", may be provided through the use of hardware such as circuit hardware and/or hardware capable of executing software in the form of non-transient coded instructions stored on non-transient computer readable medium. Thus, such functions and illustrated functional blocks are to be understood as being either hardware-implemented and/or computer-implemented, and thus machine-implemented.

In terms of hardware implementation, the functional blocks may include or encompass, without limitation, digital signal processor (DSP) hardware, reduced instruction set processor, hardware (e.g., digital or analog) circuitry including but not limited to application specific integrated circuit(s) [ASIC], and/or field programmable gate array(s) (FPGA(s)), and (where appropriate) state machines capable of performing such functions.

In terms of computer implementation, a computer is generally understood to comprise one or more processors or one or more controllers, and the terms computer and processor and controller may be employed interchangeably herein. When provided by a computer or processor or controller, the functions may be provided by a single dedicated computer or processor or controller, by a single shared computer or processor or controller, or by a plurality of individual computers or processors or controllers, some of which may be shared or distributed. Moreover, use of the term "processor" or "controller" shall also be construed to refer to other hardware capable of performing such functions and/or executing software, such as the example hardware recited above.

Figure 2:
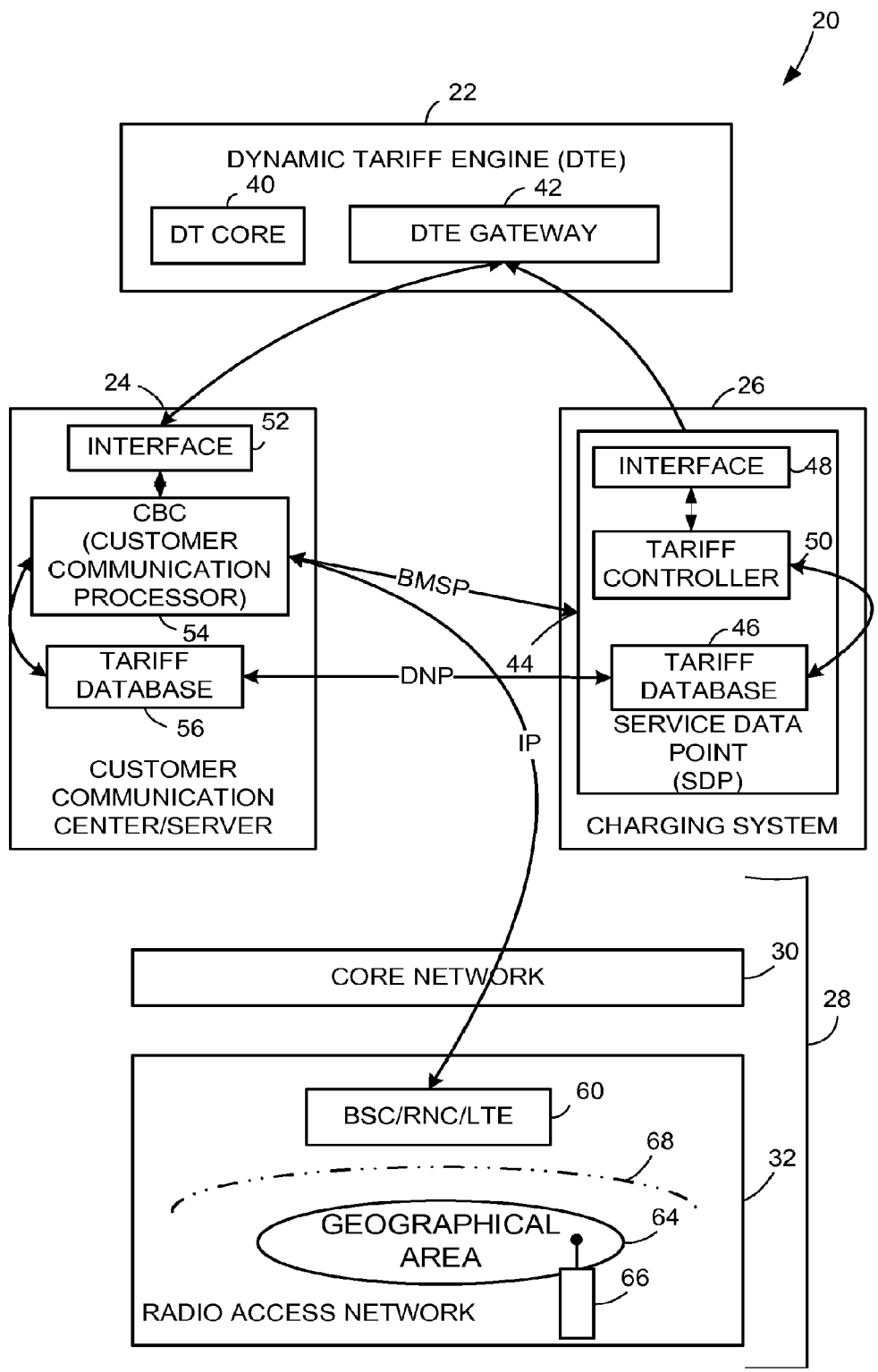
FIG. 2 is a schematic view of an example embodiment of a radio communications network comprising a charging system having notification-synchronized charging implementation.

FIG. 2 illustrates an example embodiment of a radio communications network 20. The radio communications network 20 comprises dynamic tariff engine (DTE) 22; customer communication center/server (CCC) 24; charging system 26; and access networks 28. The access networks 28, such as core network 30 and radio access network 32, are networks through which mobile/wireless terminals of customers have access to one or more telecommunications services.

In an example embodiment, dynamic tariff engine (DTE) 22 comprises both dynamic tariff core 40 and tariff gateway 42. The dynamic tariff core 40 computes, is configured with, or is inputted with tariff information for a service. The tariff information is associated with a service, and may also be specified with a particular geographical area which has access to the service, e.g., a set or sub-set of service participants or recipients. The geographical area may be specified, for example, by a cell of the radio access network 32. The tariff gateway 42 is configured to transmit, e.g., the tariff information, to other servers or systems, e.g., to customer communication center/server (CCC) 24 and to charging system 26 as herein described.

In an example embodiment charging system 26 comprises one or more service data points (SDPs) 44. The person skilled in the art understands that the charging system 26 may comprise other nodes besides SDPs, such as nodes which are known as Account Information and Refill Server (AIR), Charging Control Node (CCN), Charging data Reporting System (CRS), Customer Management System Voucher Server (VS), as examples. In view of its capabilities as described herein, charging system 26 is known as a charging system having notification-synchronized charging implementation. As shown in more detail in FIG. 2, the example service data point (SDP) 44 of charging system 26 comprises charging system tariff database 46; charging interface 48; and tariff controller 50. In some contexts, such as the Third Generation Partnership Project (3GPP), either or both of the service data point (SDP) 44 and its tariff controller 50 may also be referred to as a rating engine, as described, for example, in 3GPP TS 02.24 Description of Charge Advice Information (CAI), 3GPP TS 02.60 General Packet Radio Service, 3GPP TS 02.16 International Mobile Station Equipment Identities (IMEI), which is incorporated herein by reference. In general, a rating engine is the entity or node which determines the rate for a service by using a tariff database such as charging system tariff database 46. The charging system tariff database 46 may be external to the service data point (SDP) 44, although generally each of the possible plural service data points (SDPs) 44 comprising the charging system 26 has its own associated charging system tariff database 46. In the example embodiment shown in FIG. 2, the charging system tariff database 46 comprises or is actually included in a service data point (SDP) 44.

The customer communication center/server (CCC) 24 is configured to be suitable for use with the notification-synchronized charging system 26. In an example embodiment customer communication center/server (CCC) 24 comprises interface 52; a communications processor known as a cell broadcast center (CBC) 54; and communications server tariff database 56. The cell broadcast center (CBC) 54 may also take the name of customer communication processor 54.

The customer communication center/server (CCC) 24 communicates with the dynamic tariff engine (DTE) 22 through CCC interface 52. The CCC interface 52 is connected to cell broadcast center (CBC) 54 to enable cell broadcast center (CBC) 54 to act on messages received from the dynamic tariff engine (DTE) 22. The cell broadcast center (CBC) 54 has access to communications server tariff database 56 which, at least in the illustrated embodiment, is shown as being within customer communication center/server (CCC) 24. The cell broadcast center (CBC) 54 also communicates, through an unillustrated Internet Protocol (IP) interface, with access networks and, through an unillustrated Broadcast Message Synchronization protocol (BMSP) interface, with the service data point (SDP) 44 of the charging system 26.

The cell broadcast center (CBC) 54 communicates using Internet Protocol (IP) with access networks 28, e.g., through core network 30 to radio access network 32 and to radio network nodes 60 which control, manage, or supervise radio base stations, e.g., base station controllers or radio network controllers, or which, in some networks such as Long Term Evolution (LTE), are the base stations themselves. FIG. 2 further depicts a geographical area 64 which is wirelessly served by radio base stations which are controlled by or comprise the radio network nodes 60. FIG. 2 also shows a wireless terminal 66 of a customer which is located in geographical area 64 and which communicates using radio frequencies across a radio or air interface 68 with one or more radio base stations of radio access network 32.

As used herein, "geographical area" may be one or more radio cells, or one or more cellular location areas, or one or more wireless service areas. The size of a geographical area may vary, such that different geographical areas may have different sizes or coverage extent. The size of extent of a geographical area may depend, for example, on number, power, or other parameter of radio base stations that are controlled by a respective radio access node.

As shown in FIG. 2, charging system comprises interface and tariff controller 50. As is described herein, interface receives tariff information regarding a telecommunications service for a geographical area 64. The tariff controller 50 utilizes the tariff information in conjunction with charging for use of the telecommunications service by a customer in the geographical area 64 only after confirmation has been received that notification regarding the tariff information has been received by a node 60 of a radio access network 32 which serves the geographical area 64. As such, the tariff controller 50 is said to have or implement "notification-synchronized charging".

Figure 3:
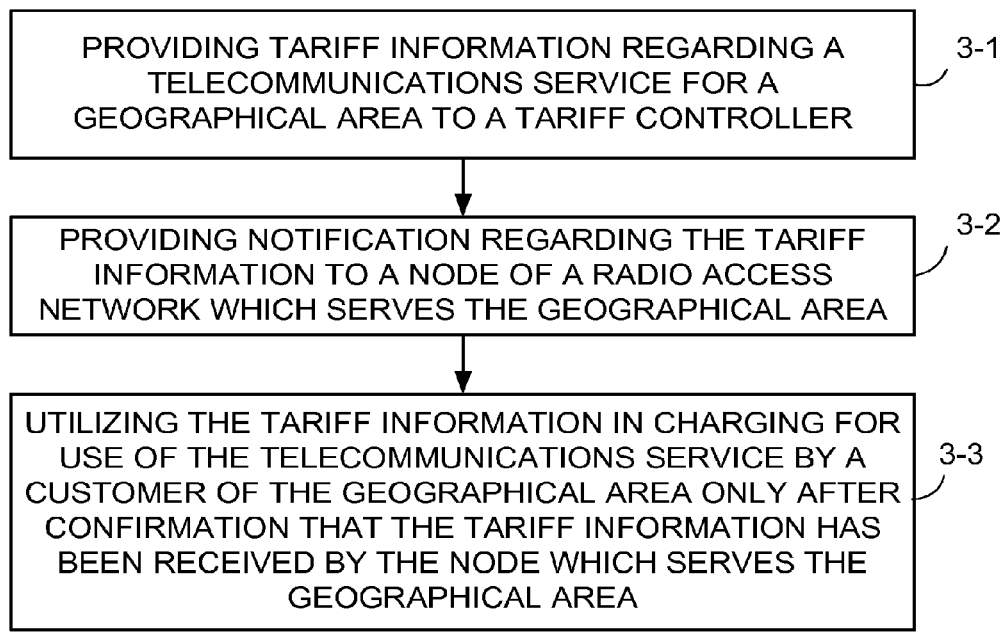
FIG. 3 is a flowchart illustrating example acts or steps comprising a method of operating a communications system which includes a charging system having notification-synchronized charging implementation.

FIG. 3 illustrates example acts or steps comprising a method of operating a communications system which includes a charging system having notification-synchronized charging implementation. Act 3-1 comprises providing tariff information regarding a telecommunications service for a geographical area 64 to tariff controller 50. Act 3-2 comprises providing notification regarding the tariff information to a node of a radio access network 32 which serves the geographical area 64. Act 3-3 comprises the tariff controller 50 utilizing the tariff information in conjunction with charging for use of the telecommunications service by a customer in the geographical area 64 only after confirmation has been received that the notification regarding the tariff information has been received by the node 60 of the radio access network 32 which serves the geographical area 64.

Figure 4:
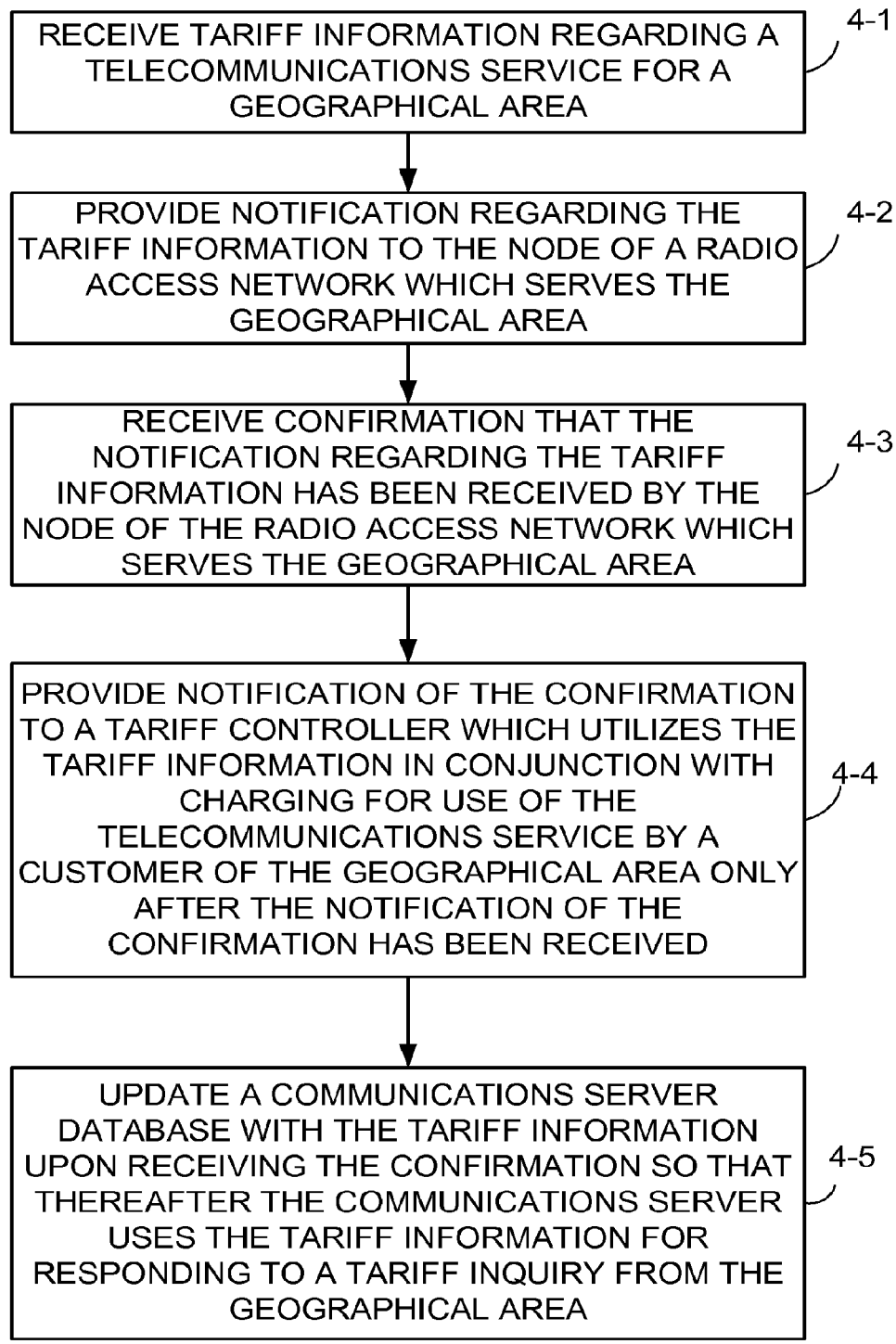
FIG. 4 is a flowchart illustrating example acts or steps comprising a method of operating a communications server suitable for use with a charging system having notification-synchronized charging implementation.

FIG. 4 shows example acts or steps comprising a method of operating a communications server 24 suitable for use with a charging system 26 having notification-synchronized charging implementation. Act 4-1 comprises the communications server 24 receiving tariff information regarding a telecommunications service for a geographical area 64. Act 4-2 comprises the communications server 24 providing notification regarding the tariff information to the node of the radio access network 32 which serves the geographical area 64. Act 4-3 comprises the communications server 24 receiving confirmation that the notification regarding the tariff information has been received by the node of the radio access network 32 which serves the geographical area 64. Act 4-4 comprises the communications server 24 thereafter providing notification of the confirmation to tariff controller 50. The tariff controller 50 utilizes the tariff information in conjunction with charging for use of the telecommunications service by a customer of the geographical area 64 only after the notification of the confirmation has been received. Act 4-5 comprises updating a communications server database 56 with the tariff information upon receiving the confirmation so that thereafter the communications server 24 uses the tariff information for responding to a tariff inquiry from the geographical area 64

Figure 5:
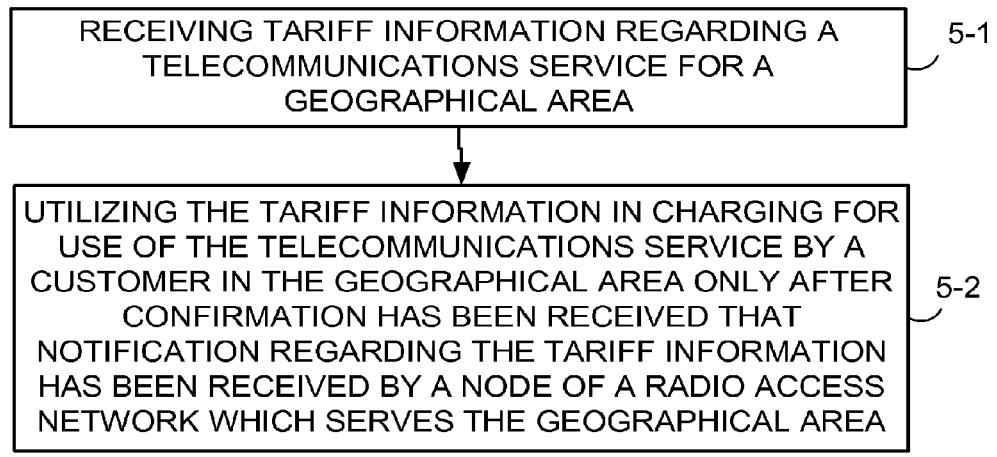
FIG. 5 is a flowchart illustrating example acts or steps comprising a method of operating a charging system having notification-synchronized charging implementation.

FIG. 5 shows example acts or steps comprising a method of operating a charging system for a telecommunications service. Act 5-1 comprises the charging system 26 receiving tariff information regarding a telecommunications service for a geographical area 64. Act 5-2 comprises the charging system 26 utilizing the tariff information in conjunction with charging for use of the telecommunications service by a customer in the geographical area 64 only after confirmation has been received that notification regarding the tariff information has been received by a node 60 of a radio access network 32 which serves the geographical area 64.

Figure 6:
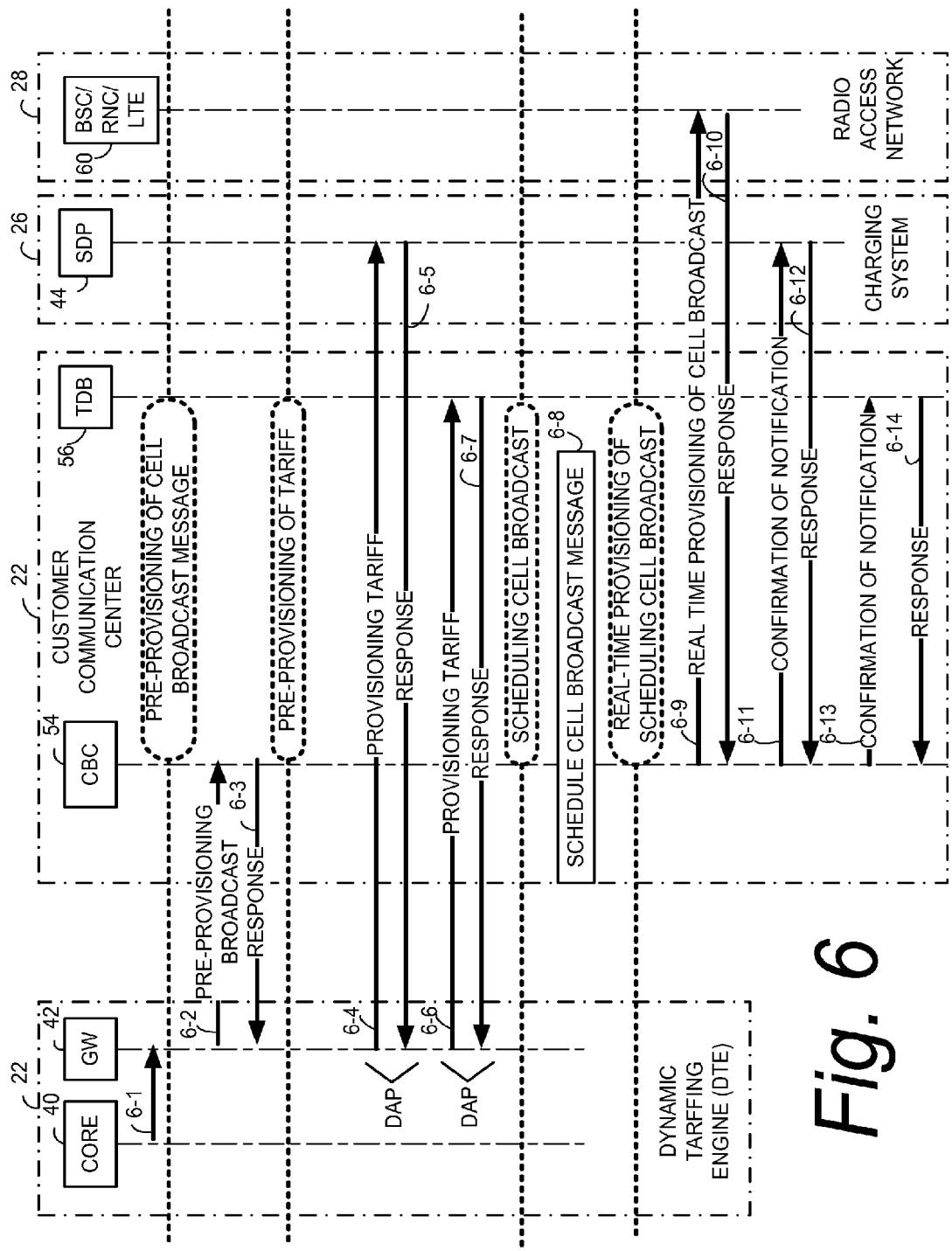
FIG. 6 is a signaling diagram illustrating an example embodiment and mode of a method of operating a communications system which includes a charging system having notification-synchronized charging implementation.

The method of operating a communications system of FIG. 3, the method of operating a communications server 24 of FIG. 4, and the method of operating a charging system of FIG. 5 are all understood in overall context of the example method comprising acts or steps shown in FIG. 6.

Act 6-1 comprises the dynamic tariff engine core 40 calculating or otherwise determining a new tariff for at least one geographical area 64, e.g., for at least one cell of radio access network 32, as well a time of implementation for the new tariff. As subsequently described in more detail herein, act 6-1 may comprise determining a new tariff for plural geographical areas 64 and respective implementation times for the plural geographical areas 64. Act 6-1 also represents the dynamic tariff engine core 40 sending the new tariff and corresponding implementation time(s) to the dynamic tariff engine gateway 42.

The first horizontal broken line of FIG. 6, occurring after act 6-1 depicts beginning of a phase of operation for pre-provisioning of a cell broadcast message. Act 6-2 comprises transmission of a "pre-provisioning cell broadcast message" which includes the new tariff, the new tariff location, and the new tariff implementation time. The "pre-provisioning cell broadcast" message of act 6-2 is transmitted from dynamic tariff engine gateway 42 to CBC processor 54 of customer communication server 24. Act 6-2 also comprises creation by CBC processor 54 of a "broadcast" message, also known as a new tariff commencement message, that relates to the location of the new tariff, e.g., geographical area 64, the new tariff amount; and time of implementation of the new tariff. Act 6-3 comprises the CBC processor 54 sending back to the dynamic tariff engine (DTE) 22, a response message which verifies delivery of the pre-provisioning broadcast message. The transmissions of act 6-2 and act 6-3 may be accomplished using any suitable protocol such as, e.g., a HTTP/REST protocol.

The second horizontal broken line of FIG. 6, occurring after act 6-3 depicts beginning of a phase of operation for pre-provisioning of a tariff. Act 6-4 comprises the transmission of a "pre-provisioning tariff" message which includes the new tariff, the new tariff location, and the new tariff implementation time. The "pre-provisioning tariff" message of act 6-4 is transmitted from dynamic tariff engine gateway 42 to tariff controller 50 of charging system 26. The transmission of act 6-4 may be accomplished using the Discount Administration Protocol (DAP). Act 6-4 thus corresponds to act 3-1 of FIG. 3 in providing tariff information regarding a telecommunications service for a geographical area 64 to tariff controller 50; and to act 5-1 of FIG. 5 in the tariff controller 50 receiving tariff information regarding a telecommunications service for a geographical area 64.

Act 6-5 comprises the tariff controller 50 sending back to the dynamic tariff engine (DTE) 22, using the DAP protocol, a response message which verifies delivery of the pre-provisioning tariff message. It should be understood that the "pre-provisioning tariff" message of act 6-4 is transmitted to tariff controller 50 considerably before the new tariff implementation time, e.g., perhaps days before the new tariff implementation time.

Also in the phase of pre-provisioning of the tariff, act 6-6 comprises transmission of a second "pre-provisioning tariff"

message which includes the new tariff, the new tariff location, and the new tariff implementation time. The second "pre-provisioning tariff" message of act 6-6 is transmitted from dynamic tariff engine gateway 42 to communications server database 56 of customer communication server 24. The transmission of act 6-6 may be accomplished using the Discount Administration Protocol (DAP). Act 6-6 thus corresponds to act 4-1 of FIG. 4 in that the communications server 24 receives tariff information regarding a telecommunications service for a geographical area 64.

Act 6-7 comprises the communications server database 56 sending back to the dynamic tariff engine (DTE) 22, using the DAP protocol, a response message which verifies delivery of the second pre-provisioning tariff message.

The third horizontal broken line of FIG. 6, occurring after act 6-7 depicts beginning of a phase of operation for scheduling cell broadcast. Act 6-8 of the scheduling cell broadcast phase depicts the cell broadcast module (CBC), e.g., CBC processor 54, scheduling a broadcast message, also known as the new tariff commencement message, for the radio network node(s) 60.

The fourth horizontal broken line of FIG. 6, occurring after act 6-8 depicts a phase of real-time provisioning of the scheduled cell broadcast message, also known as the new tariff commencement message. Act 6-9 of the real-time provisioning phase comprises the CBC processor 54 sending at the new tariff implementation time, via. IP protocol, the new tariff commencement message to the radio network node(s) 60 affected by the new tariff. Since the new tariff commencement message is sent at the new tariff implementation time, it is also known as the real time new tariff commencement message or real time provisioning of cell broadcast message. The real time new tariff commencement message is addressed to the appropriate radio network node(s) 60 and includes the new tariff amount. The real time new tariff commencement message is said to be a "broadcast" message in the sense that, in at least some radio access networks, the real time new tariff commencement message may be received by a control node such as a BSC node or a RNC node and is "broadcast" or distributed to plural base stations, and thus plural geographical areas 64, controlled thereby. Act 6-9 thus corresponds to act 3-2 of FIG. 3 and act 4-2 of FIG. 4 in providing notification regarding the tariff information to a node 60 of a radio access network 32 which serves the geographical area 64.

Act 6-10 depicts the BSC nodes, RNC nodes, or the base station nodes sending a response message back to CBC processor 54, using IP protocol, for verifying receipt of the real time new tariff commencement message. Act 6-10 thus corresponds to act 4-3 in that the communications server 24 receives confirmation that the notification regarding the tariff information has been received by the node of the radio access network 32 which serves the geographical area 64.

Upon receipt of the response or receipt verification message of act 6-10 from a geographical area 64, as act 6-11 the CBC processor 54 sends a confirmation of notification message for that verifying geographical area 64 to tariff controller 50. The confirmation or notification message comprises a notification to the tariff controller 50 that the cell broadcast message, also known as the new tariff commencement message, has been delivered to the radio network node 60 responsible for the geographical area 64. Act 6-11 thus corresponds to act 4-4 in that the communications server 24 provides notification of the confirmation to tariff controller 50. Act 6-11 is also reference in act 5-2 of FIG. 5 in that the charging system 26 utilizes the tariff information in conjunction with charging for use of the telecommunications service by a customer in the geographical area 64 only after confirmation has been received that notification regarding the tariff information has been received by a node 60 of a radio access network 32 which serves the geographical area 64.

Act 6-12 comprises the tariff controller 50 sending an acknowledgement to CBC processor 54 that the confirmation of notification message of act 6-11 has been received.

Both the confirmation of notification message of act 6-11 and the acknowledgement message of act 6-12 may be implemented using a Broadcast Message Synchronization protocol (BMSP). For example, the confirmation of notification message of act 6-11 and the acknowledgement message of act 6-12 may be of a HTTP/REST protocol that includes parameters such as "discountType" (which relates to the new tariff amount), "locationIdentity" (which relates to the geographical area 64) and "startTime" (which relates to the new tariff implementation time) for the distributed cell broadcast message of act 6-9 which was acknowledged as act 6-10.

Act 6-13 comprises the CBC processor 54 of the customer communication server 24 updating its communications server database 56 with the tariff information. Act 6-14 comprises the communications server database 56 acknowledging to CBC processor 54 its receipt of the updated tariff information. Act 6-13 thus corresponds to act 4-5 wherein the customer communication server 24 updates communications server database 56 with the tariff information upon receiving the confirmation so that thereafter the communications server 24 uses the tariff information for responding to a tariff inquiry from the geographical area 64.

Figure 7:
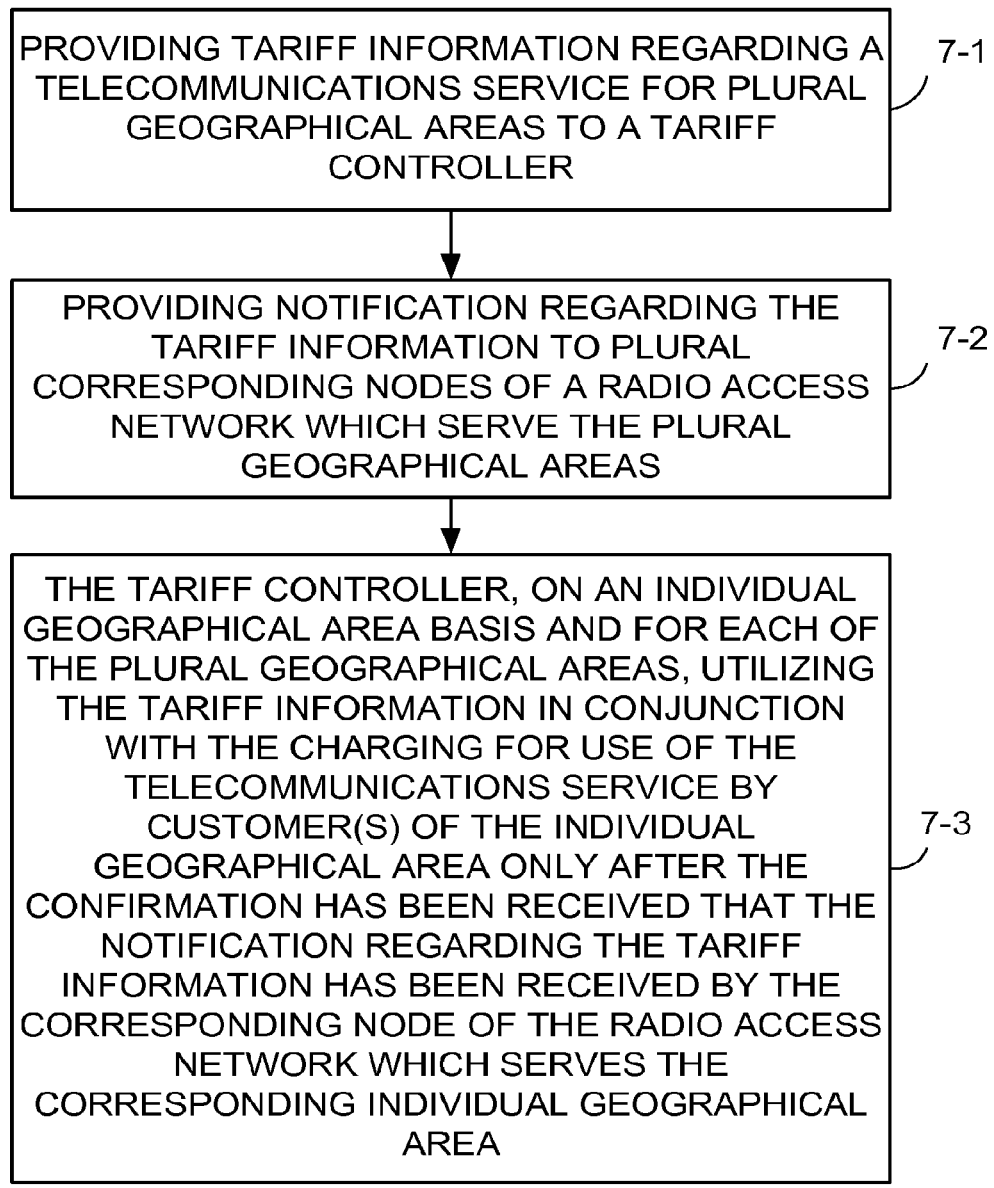
FIG. 7 is a flowchart illustrating example acts or steps comprising a method of operating a communications system which includes a multi-geographical area charging system having notification-synchronized charging implementation.

FIG. 7 illustrates example acts or steps comprising a method of operating a communications system which includes a multi-geographical area charging system having notification-synchronized charging implementation. FIG. 8 depicts operation of a system such as that operated in accordance with FIG. 7 and in particular plural synchronized implementation times in a context of plural geographical areas. In particular, FIG. 8 shows plural geographical areas $64_1$, $64_2$ served by corresponding plural nodes $60_1$, $60_2$. In FIG. 8, the acts of FIG. 6 are subscripted either with a "1" with reference to acts of FIG. 6 pertaining to geographical area $64_1$ or with a "2" with reference to acts of FIG. 6 pertaining to geographical area $64_2$.

Act 7-1 of FIG. 7 comprises CBC processor 54 providing notification regarding the tariff information to the plural corresponding nodes of radio access network 32 which serve the plural geographical areas, e.g., plural geographical areas $64_1$, $64_2$ of FIG. 8, for example. Act 7-1 corresponds to act 6-9 of FIG. 6, e.g., to the sending of the real time new tariff commencement message or real time provisioning of cell broadcast message. For geographical area $64_1$ the notification of act 7-1 corresponds to act $6-9_1$ of FIG. 8; for geographical area $64_2$ the notification of act 7-1 corresponds to act $6-9_2$ of FIG. 8. As shown in FIG. 8, it takes longer for the notification of act $6-9_2$ to reach the radio network node $60_2$ for geographical area $64_2$ than for the notification of act $6-9_1$ to reach the radio network node $60_1$ for geographical area $64_1$. The radio network node $60_2$ and radio network nodes $60_1$ return their respective acknowledgements as acts $6-10_2$ and $6-10_1$, respectively, with the acknowledgement of act $6-10_2$ arriving at CBC processor 54 later than the acknowledgement of act $6-10_1$.

Act 7-2 of FIG. 7 comprises the tariff controller 50, on an individual geographical area basis and for each of the plural geographical areas $64_1$ and $64_2$, utilizing the tariff information in conjunction with the charging for use of the telecommunications service by customer(s) in the individual geographical area. The tariff controller 50 utilizes the tariff information only after the confirmation has been received that the notification regarding the tariff information has been received by the corresponding node of the radio access network 32 which serves the corresponding individual geographical area. In other words, for geographical area $64_1$ the tariff controller 50 does not use the new tariff information for geographical area $64_1$ until after the tariff controller 50 has received the confirmation of notification message of act $6-11_1$, e.g., at time $T_1$ in FIG. 8. Similarly but separately, the controller 50 does not use the new tariff information for geographical area $64_2$ until after the tariff controller 50 has received the confirmation of notification message of act $6-11_2$, e.g., at time $T_2$ in FIG. 8. Thus, the charging implementation of the new tariff for each geographical area 64 is individually synchronized with notification of the new tariff to the respective geographical areas $64_1$, $64_2$. With this notification-synchronized charging implementation functionality, any mismatch between the rated discount and the broadcasted message to the respective geographical area will be very small, e.g., only a few seconds or so, and certainly much less than some of the time lags illustrated by the prior art practice of FIG. 1.

As is understood in the art, core network 30 detects and monitors activity and/or traffic in the core network, analyzes the activity and/or traffic, and when appropriate sends charging request messages towards the charging system 26. Thus the core network 30 may comprise certain charging clients which send the charging request messages to charging system 26 over appropriate charging interfaces The charging system 26 may comprise other units and/or functionalities, as well as other charging activities, such as those illustrated in U.S. patent application Ser. No. 13/464,397, entitled "PRODUCT-CENTRIC CHARGING SYSTEM AND METHOD", and U.S. patent application Ser. No. 13/538,340, entitled "TELECOMMUNICATIONS CHARGING WITH EXTERNALLY-CONTROLLED ACCOUNT SELECTION", both of which are incorporated herein by reference.

In an example embodiment and as depicted by way of example in FIG. 2, the customer communication server 24 and the charging system 26 may be realized by a machine platform. The terminology "machine platform" is a way of describing how the functional units of customer communication server 24 and charging system 26 may be implemented or realized by machine. The machine platform can take any of several forms, such as (for example) logic processing circuitry such as, but not limited to, electronic circuitry in the form of a computer implementation platform or a hardware circuit platform. Moreover, the functionalities of customer communication server 24 and charging system 26 may be implemented by a computer program product stored on non-transient media which, when executed by a processor, executes or performs actions including those described herein, including but not limited to the actions of FIG. 3-FIG. 6 and FIG. 7.

The Hypertext Transfer Protocol (HTTP) is an application protocol for distributed, collaborative, hypermedia information systems. Representational State Transfer (REST) is a style of software architecture for distributed systems such as the World Wide Web. REST has emerged as a predominant web API design model. REST-style architectures conventionally consist of clients and servers.

Although the description above contains many specificities, these should not be construed as limiting the scope of the technology disclosed herein but as merely providing illustrations of some of the presently preferred embodiments of the technology disclosed herein. Thus the scope of the technology disclosed herein should be determined by the appended claims and their legal equivalents. Therefore, it will be appreciated that the scope of the technology disclosed herein fully encompasses other embodiments which may become obvious to those skilled in the art, and that the scope of the technology disclosed herein is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the technology disclosed herein, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A charging system for a telecommunications service comprising:
    an interface configured to receive tariff information to take effect at a planned implementation time, the tariff information regarding a telecommunications service for a plurality of geographical areas;
    a tariff controller configured to receive, after the planned implementation time, confirmation that notification regarding the tariff information has been received by at least one of a plurality of nodes of a radio access network, each of the plurality of nodes serving an associated individual geographical area of the radio access network and, the tariff controller further configured to utilize the tariff information, on a geographical area-by-area basis, in conjunction with charging for use of the telecommunications service by a customer in an individual geographical area only after confirmation has been received that the notification regarding the tariff information has been received by the at least one node of the plurality of nodes serving the individual geographical area and has been broadcast to a plurality of wireless terminals served by the at least one node in the individual geographical area.

2. The charging system of claim 1, wherein the interface is configured to receive a message that indicates that the confirmation has been received.

3. The charging system of claim 1, wherein the individual geographical area comprises wireless terminals served by a cell of the radio access network, and wherein the confirmation comprises confirmation that the notification regarding the tariff information has been received by the at least one node which serves the cell.

4. A method of operating a telecommunications service comprising:
    providing tariff information to take effect at a planned implementation time, the tariff information regarding a telecommunications service for a plurality of geographical areas to a tariff controller;
    providing notification regarding the tariff information to a plurality of nodes of a radio access network, each of the plurality of nodes serving an associated individual geographical area;
    the tariff controller receiving, after the planned implementation time, confirmation that the notification regarding the tariff information has been received by at least one of the plurality of nodes which serves an individual geographical area of the radio access network and utilizing the tariff information, on a geographical area-by-area basis, in conjunction with charging for use of the telecommunications service by a customer in the individual graphical area only after confirmation has been received that the notification regarding the tariff information has been received by the at least one node of the plurality of nodes serving the individual geographical area and has been broadcast to a plurality of wireless terminals served by the at least one node in the individual geographical area.

5. The method of claim 4, wherein the individual geographical area comprises wireless terminals served by a cell of the radio access network, and wherein the confirmation comprises confirmation that the notification regarding the tariff information has been received by the at least one node which serves the cell.

6. The method of claim 4, further comprising:
   providing the tariff information to a communications server;
   using the communications server for providing the notification regarding the tariff information to the at least one node of the radio access network which serves the individual geographical area;
   the communications server receiving the confirmation that the notification regarding the tariff information has been received by the at least one node of the radio access network which serves the individual geographical area;
   upon receiving the confirmation, the communications server:
      providing notification of the confirmation to the tariff controller;
      updating a communications server database with the tariff information upon receiving the confirmation and thereafter using the tariff information for responding to a tariff inquiry from the individual geographical area.

7. A communications server comprising a processor configured to:
   receive tariff information to take effect at a planned implementation time, the tariff information regarding a telecommunications service for a plurality of geographical areas;
   provide notification regarding the tariff information to at least one of a plurality of nodes of a radio access network, each of the plurality of nodes serving an associated individual geographical area;
   receive, after the planned implementation time, confirmation that the notification regarding the tariff information has been received by the at least one of the plurality of nodes serving an individual geographical area of the radio access network; and thereafter
   provide notification of the confirmation to a tariff controller which utilizes the tariff information, on a geographical area-by-area basis, in conjunction with charging for use of the telecommunications service by a customer in the individual geographical area only after the notification of the confirmation has been received that the notification regarding the tariff information has been received by the at least one node of the plurality of nodes serving the individual geographical area and has been broadcast to a plurality of wireless terminals served by the at least one node in the individual geographical area.

8. The communications server of claim 7, further comprising a communications server database (56), and wherein the processor is further configured to update the communications server database with the tariff information upon receiving the confirmation so that thereafter the communications server uses the tariff information for responding to a tariff inquiry from the individual geographical area.

9. A method in a charging system for a telecommunications service comprising:
   receiving tariff information to take effect at a planned implementation time, the tariff information regarding a telecommunications service for a plurality of geographical areas;
   receiving, after the planned implementation time, confirmation that notification regarding the tariff information has been received by at least one of a plurality of nodes of a radio access network, each of the plurality of nodes serving an associated individual geographical area; and
   utilizing the tariff information, on a geographical area-by-area basis, in conjunction with charging for use of the telecommunications service by a customer in an individual geographical area only after confirmation has been received that the notification regarding the tariff information has been received by the at least one node of the plurality of nodes serving the individual geographical area and has been broadcast to a plurality of wireless terminals served by the at least one node in the individual geographical area.

10. The method of claim 9, further comprising receiving a message that indicates that the confirmation has been received.

11. The method of claim 9, wherein the individual geographical area comprises wireless terminals served by a cell of the radio access network, and wherein the confirmation comprises confirmation that the notification regarding the tariff information has been received by the at least one node which serves the cell.

12. The charging system of claim 1, wherein the confirmation indicates that the at least one node of the radio access network has broadcast the tariff information to a plurality of wireless units served by the at least one node within the individual geographical area.

13. The method of claim 4, wherein the confirmation indicates that the at least one node of the radio access network has broadcast the tariff information to a plurality of wireless units served by the at least one node within the individual geographical area.

14. The communication server of claim 7, wherein the confirmation indicates that the at least one node of the radio access network has broadcast the tariff information to a plurality of wireless units served by the at least one node within the individual geographical area.

15. The method of claim 9, wherein the confirmation indicates that the at least one node of the radio access network has broadcast the tariff information to a plurality of wireless units served by the at least one node within the individual geographical area.

* * * * *